(12) United States Patent
Ebert

(10) Patent No.: US 7,681,140 B2
(45) Date of Patent: Mar. 16, 2010

(54) MODEL-BASED CUSTOMER ENGAGEMENT TECHNIQUES

(75) Inventor: Peter Ebert, Menlo Park, CA (US)

(73) Assignee: SAP AG, Walldorf (DE)

( * ) Notice: Subject to any disclaimer, the term of this patent is extended or adjusted under 35 U.S.C. 154(b) by 408 days.

(21) Appl. No.: 11/726,833

(22) Filed: Mar. 23, 2007

(65) Prior Publication Data

US 2008/0235604 A1    Sep. 25, 2008

(51) Int. Cl.
    *G06F 3/48* (2006.01)
    *G06F 3/00* (2006.01)
    *G05B 11/01* (2006.01)

(52) U.S. Cl. ................ 715/769; 715/764; 715/848; 715/810; 715/835; 700/17

(58) Field of Classification Search ............... 715/764, 715/848, 810, 835; 700/17
See application file for complete search history.

(56) References Cited

U.S. PATENT DOCUMENTS

| | | | |
|---|---|---|---|
| 5,760,788 A * | 6/1998 | Chainini et al. ............ 345/474 |
| 6,334,127 B1 | 12/2001 | Bieganski et al. |
| 2006/0166642 A1 * | 7/2006 | Puthenpura et al. ........ 455/406 |
| 2008/0222615 A1 * | 9/2008 | Bourges-Waldegg et al. ............ 717/136 |

OTHER PUBLICATIONS

Adomavicius, Gediminas, et al., "Toward the Next Generation of Recommender Systems: A Survey of the State-of-the-Art and Possible Extensions", IEEE Transactions on Knowledge and Data Engineering, vol. 17, No. 6, (Jun. 2005).

Schafer, J. Ben, et al., "Recommender Systems in E-Commerce", Proceedings of the 1st ACM Conference on Electronic Commerce, (1999).

* cited by examiner

*Primary Examiner*—William L Bashore
*Assistant Examiner*—Ece Hur
(74) *Attorney, Agent, or Firm*—Brake Hughes Bellermann LLP

(57) ABSTRACT

The graphical user interface may include a first portion configured to display a plurality of selectable entity characteristic icons, to receive selections from a user of a first selected entity characteristic and of a second selected entity characteristic thereby, and to provide in response at least a first graphical representation and a second graphical representation thereof, respectively. The graphical user interface also may include a second portion configured to display a graphical entity model that includes a combination of the first graphical representation and the second graphical representation, and a third portion configured to display at least a first suggested product to the user, based on the graphical entity model.

20 Claims, 6 Drawing Sheets

MODEL-BASED CUSTOMER ENGAGEMENT TECHNIQUES

TECHNICAL FIELD

This description relates to techniques for attracting and retaining online customers.

BACKGROUND

In theory, customers and providers have the same goal of matching needs of the customers with offerings of the providers, at an agreed price. In practice, however, it may be difficult for a provider to demonstrate that available offerings are suitable and desirable for a particular customer. In particular, for example, in the context of the Internet, potential customers are free to visit websites of many different providers, and to do so quickly and anonymously. Consequently, even if a provider possesses exactly the correct offering for a particular customer, the provider may not have the time or the information necessary to demonstrate this offering to the customer.

As a result, providers may attempt, for example, to increase one or both of a time spent with each potential customer, or an amount of information known about each customer. For example, and again in the example context of the Internet, providers may ask potential customers to provide useful information, e.g., by filling out one or more registration forms that identify a name, age, gender, business, e-mail address, or other identifying information. As a potential customer spends more time at a particular website, and provides more of such identifying information, it becomes more likely that the provider may find an offering that is matched to the needs of the potential customer. In related examples, providers may ask potential customers to provide ratings or other indications of interest for current or potential offerings. Then, the provider may use recommendation systems to suggest one or more of the provider's offerings.

In these and other existing systems, however, potential customers may be hesitant to provide such information about themselves. For example, potential customers may not wish to take the time to fill out a series of questions, or to provide a rating of one or more offerings. In these and other examples, potential customers also may have concerns regarding privacy (e.g., may not wish to have their information distributed, or may not wish to receive undesired solicitations). As a result, customers may not obtain a offering that would have been beneficial, and providers may lose the opportunity to establish a relationship with one or more customers.

SUMMARY

According to one general aspect, a computer program product for providing model-based customer engagement is tangibly embodied on a computer-readable medium and includes executable code that, when executed, is configured to cause a data processing apparatus to provide a graphical user interface. The graphical user interface may include a first portion configured to display a plurality of selectable entity characteristic icons, to receive selections from a user of a first selected entity characteristic and of a second selected entity characteristic thereby, and to provide in response at least a first graphical representation and a second graphical representation thereof, respectively. The graphical user interface also may include a second portion configured to display a graphical entity model that includes a combination of the first graphical representation and the second graphical representation, and a third portion configured to display at least a first suggested product to the user, based on the graphical entity model.

According to another general aspect, a system includes a request handler configured to receive a first selected entity characteristic of an entity and a second selected entity characteristic of the entity, based on a first entity characteristic icon and a second entity characteristic icon, respectively, that are displayed on a graphical user interface, a rendering engine configured to determine a first graphical representation of the first selected entity characteristic and a second graphical representation of the second selected entity characteristic, and further configured to combine the first graphical representation and the second graphical representation to obtain a graphical entity model and display the graphical entity model on the graphical user interface, and a report generator configured to determine profile information related to the user based on the graphical entity model, store the first entity characteristic, the second entity characteristic, and the graphical entity model in an entity model file, and store the entity model file in association with the profile information.

According to another general aspect, a method includes providing a plurality of entity characteristic icons to a user on a graphical user interface, receiving a first selected entity characteristic of the entity by way of a first selected entity characteristic icon, determining a first graphical representation of the first selected entity characteristic, receiving a second selected entity characteristic of the entity by way of a second selected entity characteristic icon, and determining a second graphical representation of the second selected entity characteristic. The method further includes combining the first graphical representation and the second graphical representation to obtain a graphical entity model, providing the graphical entity model on the graphical user interface, determining profile information related to the user, based on the graphical entity model, storing the first selected entity characteristic, the second selected entity characteristic, and the graphical entity model in an entity model file, and storing the entity model file in association with the profile information.

The details of one or more implementations are set forth in the accompanying drawings and the description below. Other features will be apparent from the description and drawings, and from the claims.

DETAILED DESCRIPTION

Figure 1:
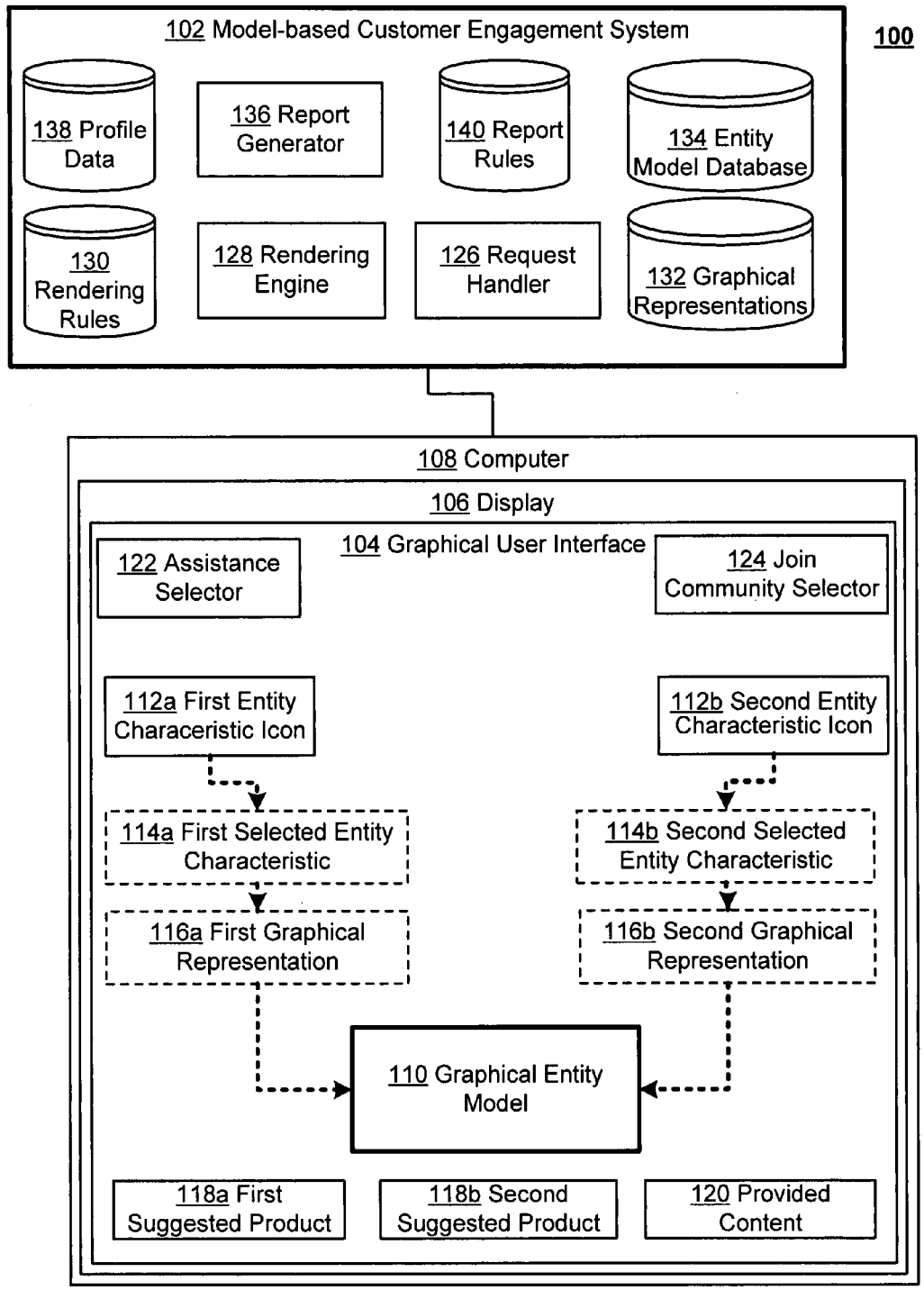
FIG. 1 is a block diagram of a system for model-based customer engagement.

FIG. 1 is a block diagram of a system 100 for model-based customer engagement. Specifically, in the example of FIG. 1, a model-based customer engagement system 102 allows sellers, retailers, and other online providers of goods and services to attract users (e.g., potential customers), and to stimulate the attention and interest of the users using a graphical, visual, dynamic, game-like environment in which the users construct a representation or model of a current or future (e.g., wished-for) entity. At the same time, the model-based customer engagement system 102 determines and collects information about the users, based on the selections of the users within the environment, and without requiring, at least initially, a registration or other effort or disclosure on the part of the users. Consequently, for example, the system 100 allows providers of goods and services to provide meaningful suggestions of goods, services, or content, that may be enjoyable to, or useful for, a specific user, and to collect information about a customer base in the singular and in the aggregate, as well.

As shown, the model-based customer engagement system 102 may be operated in conjunction with a graphical user interface (GUI) 104. The GUI 104 may include, for example, a browser or other software application that is configured to allow a user thereof to display and/or interact with various types of data. The GUI 104, e.g., browser, may be configured, for example, to obtain information from remote sources, e.g., server computers, using various protocols (e.g., hyptertext transfer protocol (HTTP)) and associated techniques, examples of which are known, and/or are described herein.

As should be apparent, the GUI 104 may be implemented on a conventional display 106. The display 106 may typically be operated in conjunction with a computer 108, which may represent, for example, a desktop or laptop computer, a personal digital assistant (PDA), a networked computer (e.g., networked on a local area network (LAN)), or virtually any type of data processing apparatus. As should also be apparent, the computer 108 may be associated with various types of storage techniques and/or computer-readable media, as well as with one or more processors for executing instructions stored thereon.

In FIG. 1, the model-based customer engagement system 102 is configured to allow a user to generate a personalized graphical entity model 110 that, as just referenced, provides a visual representation of a current or future entity. In this regard, the term entity may be understood to include or represent one or more persons or things for which (or in connection with which) a user may wish to purchase a good or service. For example, an entity may include a for-profit organization, such as a business or an enterprise, or a non-profit organization, such as a school, government, church, charity, or hospital. An entity also may include, for example, a person or type/category of persons, or a particular product or type/category of products. Although many other examples may be appreciated to exist, the present description primarily describes and illustrates (e.g., in the screenshots of FIGS. 5-6) one or more example scenarios in which the entity includes a business or enterprise for which the user, as a purchaser for the business or enterprise, is authorized to make purchase decisions of goods or services, such as business software.

In constructing the graphical entity model 110, the model-based customer engagement system 102 may provide the user with one or more entity characteristics, illustrated in FIG. 1 as a first entity characteristic icon 112a and a second entity characteristic icon 112b. It will be appreciated from the above description that the entity characteristic icons 112a, 112b may represent graphical illustrations of characteristics of any of the referenced, example entities. For example, where the entity is an enterprise, the entity characteristics may include a number of employees, an industry, a goal of the enterprise, a location(s) of offices of the enterprise, or other features or traits of the enterprise. Of course, although only two such entity characteristic icons are illustrated in FIG. 1, it will be appreciated that any suitable number may be used.

Consequently, the user may select a particular instance of each of the characteristic icons 112a, 112b. For example, and continuing the above example, if the first entity characteristic icon 112a is related to a number of employees of an enterprise, then a first selected entity characteristic 114a may represent a particular, selected number or range of numbers, such as 1-10 employees, or 5000 employees. Meanwhile, if the second entity characteristic icon 112b relates to a location of offices of the enterprise, then the second selected entity characteristic 114b may represent a particular location, such as the United States, or the United Kingdom.

Based on these selections, the model-based customer engagement system 102 may determine corresponding graphical representations, illustrated in FIG. 1 as a first graphical representation 116a and a second graphical representation 116b. Continuing the above examples, the employee size selection may be represented by a visual representation of a building, where the model-based customer engagement system 102 renders the building at different sizes to correspond to lesser or greater numbers of employees. Or, the first graphical representation 116a may represent the number of employees with corresponding person-shaped icons. Of course, a numerical or text representation of the selected number also may be provided within, or in association with, the graphical entity model 110. Similarly, the second graphical representation 116b, in the above example in which the second entity characteristic icon 112b represents a location of an enterprise, may represent a flag, map, or other icon representing the location in question.

Then, the model-based customer engagement system 102 may join or combine the first graphical representation 116a and the second graphical representation 116b to form the graphical entity model 110. For example, the appropriately-sized building corresponding to the selected number of employees may be placed within a map of the identified location, or with a flag associated with a selected country or region. Consequently, the graphical entity model 110 may be immediately associated with any viewer as representing an enterprise of a certain size and in a certain location.

The user experience of constructing the graphical entity model 110 may be implemented by the model-based customer engagement system 102 as an interactive, game-like experience in which the user quickly and easily constructs the graphical entity model 110 in a manner that is dynamic and visually-based. For example, the first and second entity characteristic icons 112a, 112b may be located in at least a first portion of the GUI 104, so that the user may drag-and-drop the first selected entity characteristic 114a to a designated, second portion of the GUI 104 that is associated with the graphical entity model 110 to be constructed, whereupon the model-based customer engagement system 102 may automatically render the first graphical representation 116a within the designated, second portion. Of course, other methods may be used, e.g., a point-and-click. In some implementations, the graphical representations 116a, 116b may themselves be displayed as such on the GUI 104 (for example, buildings at different sizes representing the differing number of employees, or different flags associated with different regions). In other example implementations, the entity characteristic icons 112a, 112b may be provided as simple text-based choices, and then the model-based customer engagement system 102 may automatically generate and render the corresponding graphical representations 116a, 116b, based on the respective selected entity characteristics 114a, 114b. Meanwhile, the suggested products 118a, 118b or other content 120 may be provided in a third portion of the GUI 104, as shown.

Construction of the graphical entity model 110 by the user may continue by selection of additional entity characteristics, or de-selection of previously-selected characteristics. During the construction of the graphical entity model 110, the model-based customer engagement system 102 may observe the selections of the user and determine corresponding suggested products that may benefit the user, shown in FIG. 1 as first suggested product 118a and second suggested product 118b. Such suggestions may thus be particularly useful to the user, even though the user need not have been asked to fill out any detailed forms regarding user preferences, or to provide any personally-identifying information (such as the user's name or email address). Similarly, the model-based customer engagement system 102 may provide provided content 120 that may be determined to be potentially useful to the user. Of course, the user has the option of selecting or not selecting any of the suggested products 118a, 118b or provided content 120, and the suggestions 118a, 118b and content 120 may change over time as the user selects or de-selects desired entity characteristics.

Thus, the graphical entity model 110 quickly and visually represents to the user a nature of a current or desired entity, and, moreover, instantly represents characteristics of such an entity to virtually anyone who views the graphical entity model. For example, the GUI 104 may include an assistance selector 122, such as a button or other icon to request assistance from a customer service representative of the provider associated with the model-based customer engagement system 102. Then, the customer representative may view the graphical entity model 110 in conjunction with the user, and may instantly see the type of enterprise that the user has, or that the user wishes to pursue/obtain.

Somewhat similarly, a join community selector 124 may be included that, when selected, causes the model-based customer engagement system 102 to create an ad-hoc community based on the graphical entity model 110 (e.g., a community of other users who may have constructed similar graphical entity models). In this way, the community of users may see one another's graphical entity models, and may discuss commonalties, differences, or other topics of interest. Further examples of techniques associated with the assistance selector 122 and the join community selector 124 are discussed below with respect to FIGS. 3-6.

By stimulating the user to construct the graphical entity model 110, the model-based customer engagement system 102 provides for indirect determination and collection of information associated with the user, without requiring an effort of a user to navigate and complete a number of different screens or forms. Moreover, the graphical entity model 110 may be of value to the user, and may be offered to the user as a value-added service, or may be used as an enticement for the user to provide registration, contact, or other identifying information. In the latter case, for example, the graphical entity model 110 may be saved as a discrete file, and the user may be provided with ownership of, or access to, this file, in exchange for registration or other identifying information.

In operation, the model-based customer engagement system 102 may include a request handler 126 that receives selections or other requests or actions of the user, such as a selection of the first selected entity characteristic 114a, or a selection of the first suggested product 118a. The request handler 126 receives these requests and performs appropriate routing thereof.

For example, in response to detection of the first selected entity characteristic 114a, the request handler may notify a rendering engine 128. Based on rendering rules 130, the rendering engine 128 may determine an appropriate one of graphical representations 132, e.g., in this example, the first graphical representation 116a. These operations may continue with selection of the second selected entity characteristic 114b by the user (resulting determination of the second graphical representation 116b from the graphical representations 132), and combination by the rendering engine 128 of the graphical representations 116a, 116b into the graphical entity model 110.

In the example of FIG. 1, the rendering rules 130 and the graphical representations 132, and combinations thereof, may be represented or constructed, for example, as objects or other software components, perhaps expressed in eXtensible Mark-up Language (XML) or other suitable language. The rendering rules 130 and the graphical representations 132 may be asynchronously loaded into the GUI 104, such as when the GUI 104 includes a browser application.

For example, when the user 104 initially selects and downloads web content associated with a website of the provider, then some or all of the model-based customer engagement system 102 also may be downloaded to the GUI 104 (e.g., browser). For example, the request handler 126 and the rendering engine 128 may be downloaded with the web content of the provider, and may obtain the associated rendering rules 130 and the graphical representations 132. In this way, for example, different sets or types of rendering rules may be obtained and used, and the rendering rules 130 may easily be dynamically changed or updated between, or even during, executions of the model-based customer engagement system 102.

As referenced, the downloading of the request handler 126, rendering engine 128, rendering rules 130, and graphical representations 132 may occur asynchronously, e.g., may occur without a specific request of the user, and may load on an as-needed basis, without requiring a refresh of the entire website (e.g., of relevant web content of the website) of the provider that has been loaded to the GUI 104. As a result, the user experience in constructing the graphical entity model 110 may be very intuitive and responsive, since, for example, the rendering engine 128 may be prepared to add or subtract graphical representations 132 (such as the graphical representations 116a, 116b) from the graphical entity model 110, according to the rendering rules 130, without having to make a call to, or request of, a remote server (not shown in FIG. 1).

In example techniques, the rendering rules 130 and the graphical representations 132 may be implemented in conjunction with Macromedia Flash™, which provides an integrated development environment (IDE) for authoring content (e.g., when the GUI 104 includes a browser, as illustrated in various examples herein) in a proprietary scripting language known as ActionScript. The content may then be provided using, for example, the associated Macromedia Flash Player within the GUI 104, e.g., within an appropriate browser. For example, the rendering engine 128 may use cascading style sheets (CSS) to present the website of the provider within the GUI 104 in a manner that is specific to the provider (e.g., branded for the provider, or with a desired color or layout).

Of course, additional or alternative techniques may be used to asynchronously load and implement some or all components of the model-based customer engagement system 102, and other components, to local memory of the GUI 104. For example, client-side scripting languages, such as, for example, JavaScript, may be used to load and implement the model-based customer engagement system 102, e.g., to modify a document object model (DOM) of an already-loaded page of the browser(s) and store the graphical representations 116a, 116b, 132, and thereby present or display the graphical entity model 110, the suggested products 118a, 118*b*, or the provided content 120. These and similar techniques may be used in conjunction with interactive web development techniques such as, for example, "Asynchronous JavaScript And XML," also referred to as Ajax. Ajax may be used to allow for interacting with a remote server while a current web page is loading (or has loaded). For example, Ajax may use the XMLHttpRequest or an IFrame object to exchange data with an associated server, usually in the XML format (although other formats may be used).

Still other additional or alternative techniques may be used to operate the model-based customer engagement system 102 as described herein. For example, Dynamic Hyper-Text Mark-up Language (DHTML) techniques, ActiveX techniques, Java applets, and/or other remote/client-side scripting techniques may be used. Further, other techniques also may be used. For example, the graphical entity model 110 may be provided by forcing or requiring a refresh of an entire page, after selection of the first selected entity characteristic 114*a* and the second selected entity characteristic 114*b*.

However the graphical entity model 110 is constructed, the model-based customer engagement system 102 may act to store the result within an entity model database 134, e.g., as an XML structure. For example, where the model-based customer engagement system 102 is implemented at a browser of a particular user, the entity model database 134 may store one or more graphical entity models 110 constructed by the user. The entity model database 134 also may be stored remotely, or may have communication with a remote storage, to accumulate graphical entity models 110 of a plurality (e.g., a community) of users. As described herein, these techniques allow for the use of the graphical entity model(s) 110 as an enticement (e.g., an object of value) for the user, that may be used by one or more users, either individually or together, and that may motivate the user to remain at, and/or return to, the website of the provider of the model-based customer engagement system 102.

As referenced above, construction of the graphical entity model 110 by the user may be used by the provider as an opportunity to determine, collect, and analyze identifying information about a user, or about a class of users. However, in example implementations in which the user is not asked to register, at least not during an initial interaction with the model-based customer engagement system 102, such identifying information may need to be deduced indirectly. In particular, it may occur that the user begins constructing the graphical entity model 110, and then abruptly stops, such as when a user is distracted, momentarily loses interest, or otherwise closes or leaves the website of the provider.

Thus, the model-based customer engagement system 102 may include a report generator 136 that receives notification of actions of the request handler 126 and the rendering engine 128, and deduces identifying information regarding the current user, perhaps in an on-going or real-time manner. For example, the report generator 136 may include, or may have access to, an expert system or other knowledge-based system that uses profile data 138 and/or report rules 140 to determine information about the user, such as role of the user within a purchasing enterprise, a current buying phase of the user/enterprise, or market segment or firmographic information about the enterprise associated with the user. For example, each selection by the user of an entity characteristic icon 112*a*, 112*b* may cause the report generator 136 to change a weighting or likelihood that the user has a particular purchasing role (e.g., investigator or actual purchaser), or is in a particular market segment, or is associated with some other characteristic.

The report generator 136 may report the results of this analysis in various ways. For example, as referenced above, the user may, in some instances, close the GUI 104 before the report generator 136 has an opportunity to respond by outputting a report or other output. Consequently, the report generator 136 may benefit from generating reports or other output at pre-determined time intervals, and/or in response to pre-determined events, e.g., as determined by the report rules 140, and using, for example, an HTTP Post command to send the report to a remote server. The report generator 136 also may output to the rendering engine 128 and/or to the rendering rules 130, so as to update the rendering rules 130 and rendering engine 130, based, for example, on previous responses from the user of the GUI 104, or other users.

The profile data 138 may include a particular profile (e.g., in an XML file) that is associated with the user, even if identifying information of the user is not yet known. For example, the report generator 136 may assign a unique identifier to the user for purposes of storing the profile data 138. Later, for example, the rendering engine 128 may offer the user an opportunity to download and save the graphical entity model 110, as referenced above, in exchange for receiving identifying information (e.g., name and email address) of the user. At such time, the report generator 136 may update the unique identifier with the actual name (or other information) of the user. Later, the report generator 136 may recognize the graphical entity model 110 (such as when the user revisits the website of the provider and re-loads the previously-saved graphical entity model 110), and may load the corresponding profile information from the profile data 138.

Although other features and advantages may be apparent from the description herein, it may be appreciated that the model-based customer engagement system 102 focuses attention of a visiting user on the graphical entity model 110, and development thereof, and not, primarily or necessarily, on accompanying product offerings or explicit collection of preferences or identifying information related to the user. Instead, such product offerings and information may be deduced by the model-based customer engagement system 102, based on the construction of the graphical entity model 110, and used by the provider to improve future product offerings and/or sales thereof. At the same time, the graphical entity model 110 provides the user with an object of value that may be used to collaborate with other users, or with (representatives of) the provider, or may be saved for other, later use by the user.

Figure 2:
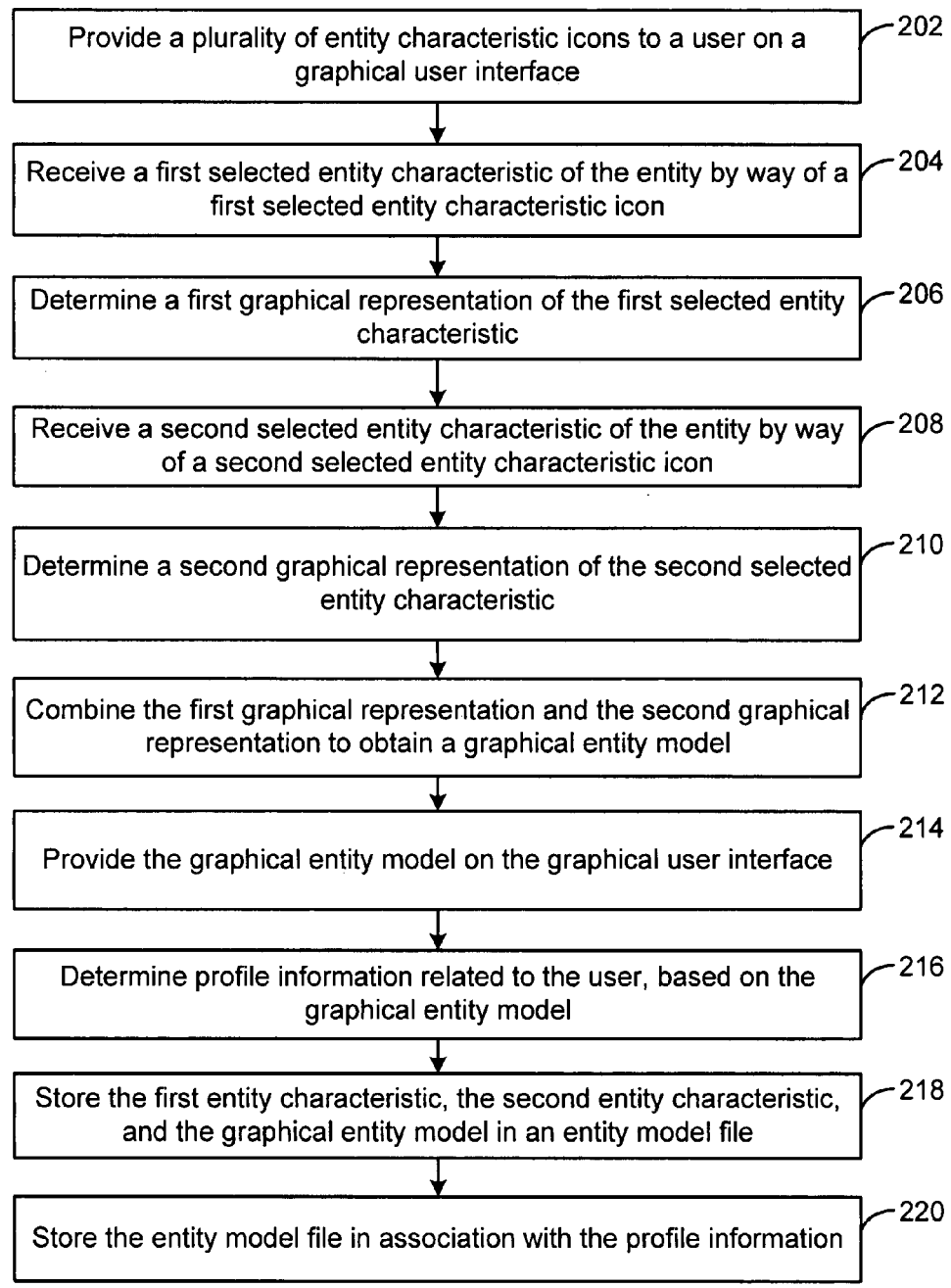
FIG. 2 is a flowchart illustrating example operations of the system of FIG. 1.

FIG. 2 is a flowchart 200 illustrating example operations of the system of FIG. 1. Although FIG. 2 is illustrated as a series of sequential operations, it will be appreciated from the present description that no particular sequence of actions may be required in a given implementation. To the contrary, the user is free to stop at any point, or to clear the GUI 104 and begin again, or to execute any other desired sequence of operations in interacting with the GUI 104 and constructing the graphical entity model 110. Further, FIG. 2 is not intended to represent a complete or exhaustive listing of possible operations of the model-based customer engagement system 102 of FIG. 1. In fact, examples of additional or alternative operations are described below, e.g., with respect to FIGS. 3 and 4.

In FIG. 2, then, a plurality of entity characteristic icons may be provided to a user on a graphical user interface (202). For example, the rendering engine 128 may provide the entity characteristic icons 112*a*, 112*b* in at least a first portion of the GUI 104, e.g., a browser. As described, provision of such entity characteristic icons 112*a*, 112*b* may be executed based on rendering rules 130 and/or graphical representations 132.

For example, the rendering rules 130 may determine whether the rendering engine 128 presents the entity characteristic icons 112a, 112b in one of a plurality of available languages. For example, the user may indicate a language preference in an earlier screen, or, in other implementations, a reverse IP (Internet Protocol) look-up may be done to determine a location of the user, and the rendering engine 128 may select a language of presentation accordingly. As also referenced above, the rendering rules 130 may specify style sheets or other resources for changing an appearance of the GUI 104 (e.g., may allow the rendering engine 128 to provide the entity characteristics 112a, 112b together in a single portion of the GUI 104, or distributed around a designated, second portion of the GUI 104 that is reserved for the graphical entity model (as illustrated, for example, in the screenshots of FIGS. 5 and 6).

A first selected entity characteristic of the entity may be received by way of a first selected entity characteristic icon (204), and a first graphical representation of the first selected entity characteristic may thereby be determined (206). For example, the request handler 126 may receive a selection of the first selected entity characteristic 114a by way of the first entity characteristic icon 112a, and the rendering engine 128 may then determine the corresponding first graphical representation thereof (e.g., from the graphical representations 132). In specific examples, the first selected entity characteristic 114a may represent a specific number or range of employees of an enterprise, and the first graphical representation 116a may illustrate a building or campus that is sized (e.g., by the rendering engine 128, based on the rendering rules 130) to correspond to the selected number or range.

Similarly, a second selected entity characteristic of the entity may be received by way of a second selected entity characteristic icon (208), and a second graphical representation of the second selected entity characteristic may be determined (210). Continuing the above example, the request handler 126 may receive a selection of the second selected entity characteristic 114b by way of the second entity characteristic icon 112b, and the rendering engine 128 may then determine the corresponding second graphical representation thereof (e.g., from the graphical representations 132). Here, the second selected entity characteristic 114b may refer to a selected location of the enterprise, so that the second graphical representation 116b may refer to a map, flag, or other representation of the specified location.

Figure 5:
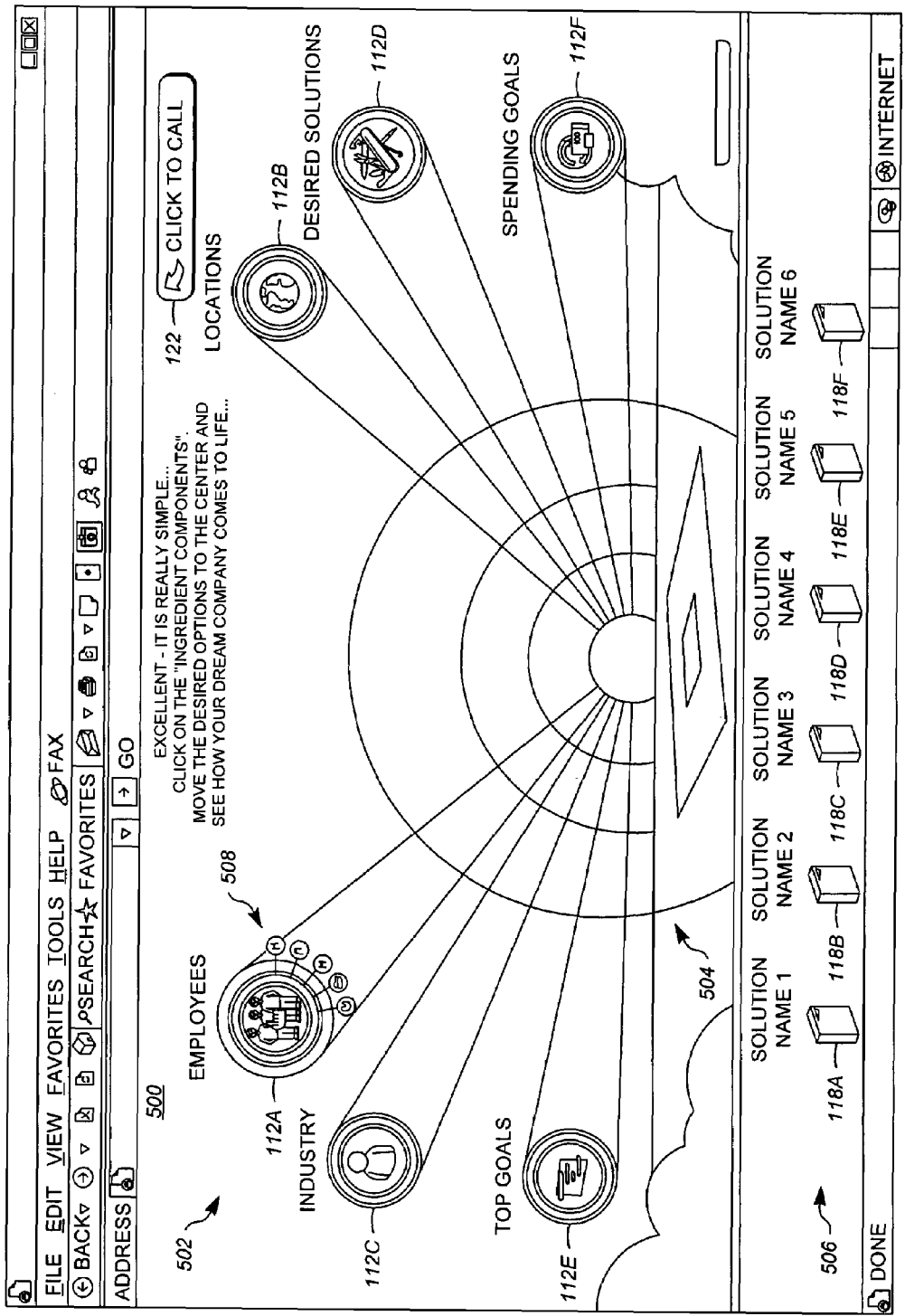
FIG. 5 is a first screenshot illustrating an example use of the systems of FIGS. 1 and 3.
Figure 6:
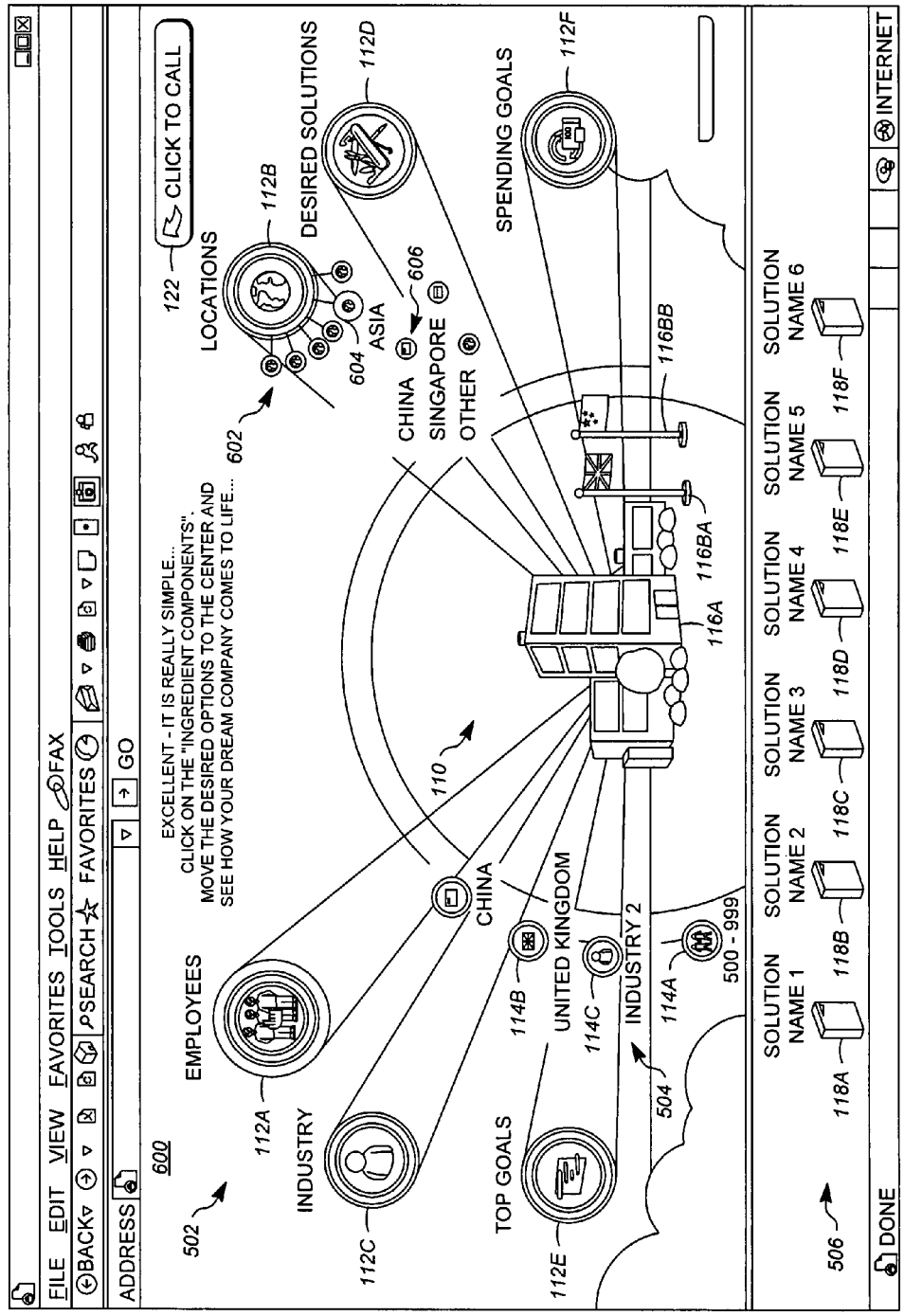
FIG. 6 is a second screenshot illustrating an example use of the systems of FIGS. 1 and 3.

The first graphical representation and the second graphical representation may be combined to obtain a graphical entity model (212). For example, the rendering engine 128 may combine the first graphical representation 116a and the second graphical representation 116b to obtain the graphical entity model 110. Continuing the above example, and as shown in FIGS. 5 and 6, below, the graphical entity model 110 may include an appropriately sized building together with a corresponding map or flag, and displayed within at least a second portion of the GUI 104, as shown in FIG. 1.

The graphical entity model may be provided on the graphical user interface (214). For example, the rendering engine 128 may render and display the graphical entity model 110, as shown in FIG. 1, and in the example screenshots of FIGS. 5 and 6.

Profile information related to the user may be determined, based on the graphical entity model (216). For example, the report generator 136 may execute report rules 140 to collect information about the user. As described herein, operations of the report generator 136 need not depend on a completion of the graphical entity model 110. Instead, the report generator 136 may update, for example, at each stage of construction of the graphical entity model 110 (e.g., after each selected entity characteristic 114a, 114b). The report rules 140 may dictate reporting by the report generator 136 after a passage of a designated amount of time, and/or after one or more events (e.g., selections of the user). As described herein, the report generator 136 may include, or be associated with, an expert system that may assign a weighting or likelihood that the user is associated with one of a plurality of roles in an enterprise, or that the user or enterprise has some other defining characteristic(s). As also described herein, such information may be used by a recommendation system to determine the suggested products 118a, 118b and/or the provided content 120 for the individual user, or may be used more generally to collect statistics about a customer base (or segments thereof) as a whole. The report generator 136 also may generate a unique ID that may be stored in the profile data 138, where, as described, this unique ID may later be matched with the user, if and when the user ultimately registers or provides identifying information.

The first selected entity characteristic, the second selected entity characteristic, and the graphical entity model may be stored in an entity model file (218). For example, the request handler 128 may implement a request of the rendering engine 128 to store the graphical entity model 110 (which represents the first selected entity characteristic 114a and the second selected entity characteristic 114b). The entity model file may thus be stored in association with the profile information (220). For example, the particular graphical entity model 110 may be stored in association with the profile having the unique ID mentioned above (which may be associated with the user's IP address or other information). In this way, the relevant graphical entity model 110 may be available to the user for download and use, even if, for example, the user temporarily leaves the website and returns at a later time. In other implementations, the entity model file and the profile information may be stored locally to the user, e.g., using a local memory associated with the GUI 104.

Figure 3:
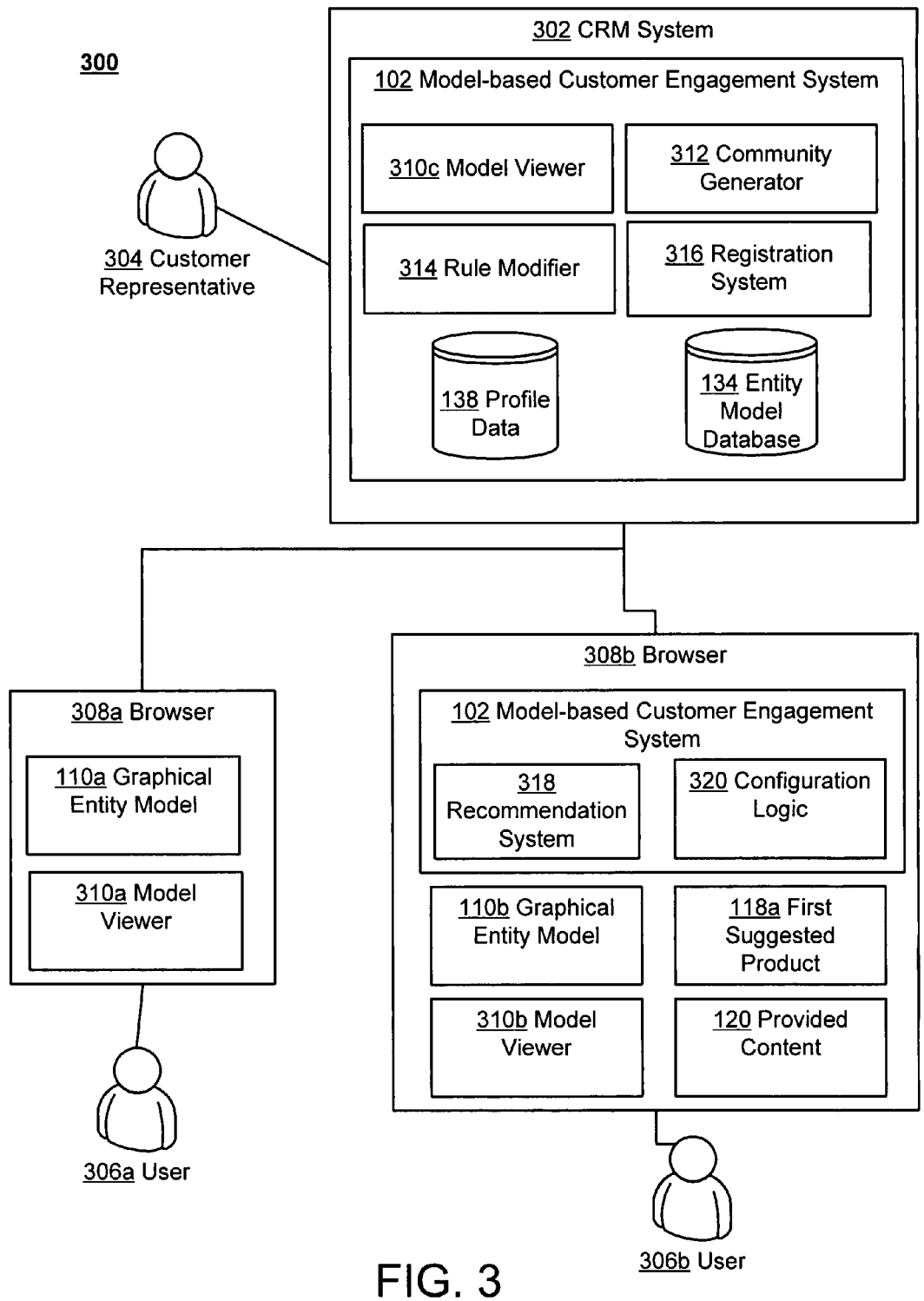
FIG. 3 is a block diagram illustrating example implementations of the system of FIG. 1.

FIG. 3 is a block diagram 300 illustrating example implementations of the system of FIG. 1. In the example of FIG. 3, a Customer Relationship Management (CRM) system 302 is illustrated that may be implemented by a provider of the model-based customer engagement system 102. As will be appreciated from the present description, the provider of the model-based customer engagement system 102 may include, for example, a seller of goods or services, or may include a third party provider acting on behalf of such a seller.

In either case, a customer representative 304 may administer a back-end or server-side aspect(s) of the model-based customer engagement system 102, while users 306a, 306b are provided with the experience of constructing graphical entity models 110a, 110b, as shown in FIG. 3 and as may be appreciated from the above description. That is, as referenced above, it is possible that the model-based customer engagement system 102 may be implemented at a server-side, a client side, or, as shown in FIG. 3, in some combination thereof. Thus, FIG. 3 is merely intended to illustrate an example implementation, so that a break-down or distribution of the model-based customer engagement system 102 may, in fact, take any division that would be apparent or desirable to one of ordinary skill in the art. Moreover in FIG. 3, it may be seen that portions of the model-based customer engagement system 102 illustrated above with respect to FIG. 1 are not necessarily reproduced in FIG. 3, for the sake of brevity and clarity.

In FIG. 3, the users 306a, 306b are illustrated as using, respectively, browsers 308a, 308b, which serve as examples of the GUI 104 of FIG. 1. The browsers 308a, 308b include model viewers 310a, 310b, which along with a model viewer 310c of the CRM system 302, allow the users 306a, 306b to share their respective graphical entity models 110a, 110b with one another, and with the customer representative 304. For example, with reference to FIG. 1, the browser 308b may include the assistance selector 122, which the user 306b may select in order to share the graphical entity model 110b with the customer representative 304. In this way, as described, the customer representative 304 may view and immediately appreciate the graphical entity model 110b and, by extension, may appreciate a nature of the enterprise of the user 306b. Consequently, the customer representative 304 may quickly, easily, and effectively provide assistance to the user 306b in, for example, extending the graphical entity model 110b, or in identifying/purchasing desired products (e.g., goods or services), or in providing pricing information for the goods or services.

Similarly, and as referenced above with respect to the join community selector 124 of FIG. 1, the model-based customer engagement system 102 may include a community generator 312, shown running on the back-end CRM system 302 in the example of FIG. 3. The community generator 312 may be configured, for example, to determine information from the profile data 138 and/or the entity model database 134 to find other users (and their respective graphical entity models) that may be similar to, or otherwise related to, the graphical entity model 110b of the user 306b.

For example, in FIG. 3, the community generator 312 may determine that the users 306a, 306b are in the same or similar industries, or may face similar challenges (e.g., both may intend to expand to a particular market or location). Somewhat similarly, the community generator 312 may determine that the users 306a, 306b may be interested to meet each other to consummate a transaction or to operate as business partners, such as when the user 306a is a manufacturer and the user 306b is a retailer.

The model viewers 310a, 310b may thus allow the users 306a, 306b to view one another's graphical entity models 110a, 110b, and to immediately ascertain one another's similarities and differences. The model viewers 310a, 310b may represent, for example, a separate window provided by the model-based customer engagement system 102, e.g., by the rendering engine 128, or may be embedded within the browser 308b, or other GUI. The model viewers 310a, 310b may initially provide thumbnail images of others' graphical entity models, which the present user may select from for purposes of viewing in more detail and/or for joining a community. For example, a chat window may be used, or a video plug-in, or web conferencing tool, or, in other implementations, an entirely separate communication channel, such as a voice-over-IP channel, may be used. Similar comments apply to the model viewer 310c of the customer representative 304.

Further in FIG. 3, a rule modifier 314 may be configured to update one or more of the rules of the model-based customer engagement system 102, including, for example, the rendering rules 130 or the report rules 140. In FIG. 3, the rule modifier 314 is illustrated at the CRM system 302, so as to have a comprehensive overview of the users 306a, 306b, and other users (now shown). In this way, the rule modifier 314 may observe actions (or lack of actions) of the users 306a, 306b, and may modify the rules 130, 140 so as to better engage the users 306a, 306b, or future users.

For example, the request handler 126 and the report generator 136 may be used to report to the rule modifier 314, such as at a completion of the graphical entity model 110b (e.g., in response to a registration of the user 306b and downloading of the graphical entity model 110b). Conversely, the rule modifier 314 may be made aware if a particular action or sequence of actions by one or more users leads to an abrupt or eventual closing of the browser 308b (or other GUI), without registration by the user(s). In this case, the rule modifier 314 may modify the rules 130, 140 so as to reduce a chance that such an undesirable ending will occur in the future (e.g., may restrict the rendering engine 128 from rendering a particular icon). In other implementations, the rule modifier may proactively and explicitly request feedback from the user(s), for the purposes of modifying the rules 130, 140.

As described, the rules 130, 140 may be implemented separately from the rendering engine 128 and the report generator 136, and may be dynamically changed in between or during an operation of the rendering engine and/or the report generator 136. Consequently, in these example implementations, the model-based customer engagement system 102 may easily be updated and improved, without having to re-code or recompile the relevant code.

A registration system 316 and a recommendation system 318 also may be used. For example, the registration system 316 may be a conventional registration system, but that is used only in response to a request from the users 306a, 306b to download their respective graphical entity models 110a, 110b. Somewhat similarly, the recommendation system 318 may be configured to receive the various selected entity characteristics 114a, 114b, as well as any deductions or determinations about the users 306a, 306b from the report generator 136, and to output the suggested products 118a, 118b and the provided content 120 based thereon. The recommendation system 318 may be configured to act in the context of the system 300, e.g., by updating automatically each time a new selected entity characteristic is received from the user.

Although FIG. 3 illustrates the registration system 316 and the recommendation system 318 at the CRM system 302 and the browser 308b, it will be appreciated that such a distribution of resources is merely for example, and that these components, as with virtually any component of the model-based customer engagement system 102, may be implemented in whole or in part at either location. Somewhat similarly, although the components of the model-based customer engagement system 102 in FIG. 3 may be illustrated separately from the components of the model-based customer engagement system 102 in FIG. 1, it will be appreciated that the various components may have overlapping structure or function. For example, the registration system 316 and/or the recommendation system 318 may either or both be implemented as part of the report generator 136 or the rendering engine 128.

Finally in FIG. 3, configuration logic 320 is illustrated that is configured to receive the graphical entity model 110b in conjunction with a suggested product or suggested content, and is configured to pre-fill or pre-designate information within the suggested product or content, based on the graphical entity model 110b. For example, if the graphical entity model 110 is constructed within the browser 308b, and the first suggested product is provided by the recommendation system 318, then the user 306b may move the graphical entity model 110b (e.g., in a drag-and-drop operation) over the first suggested product 118a. Then, the configuration logic 320 may operate to use the information in, or associated with, the graphical entity model 110b, to fill-in or provide information required by the first suggested product 11a. For example, the first suggested product 118a may require general information about a size, location, or industry of an enterprise of the user 306b. In other examples, where the user 306b already has registered with the registration system 316, the configuration logic 320 may be used to provide more detailed information within the first suggested product 118a, e.g., by retrieving identifying information for the user 306b from the profile data 138 and/or the entity model database 134.

Figure 4:
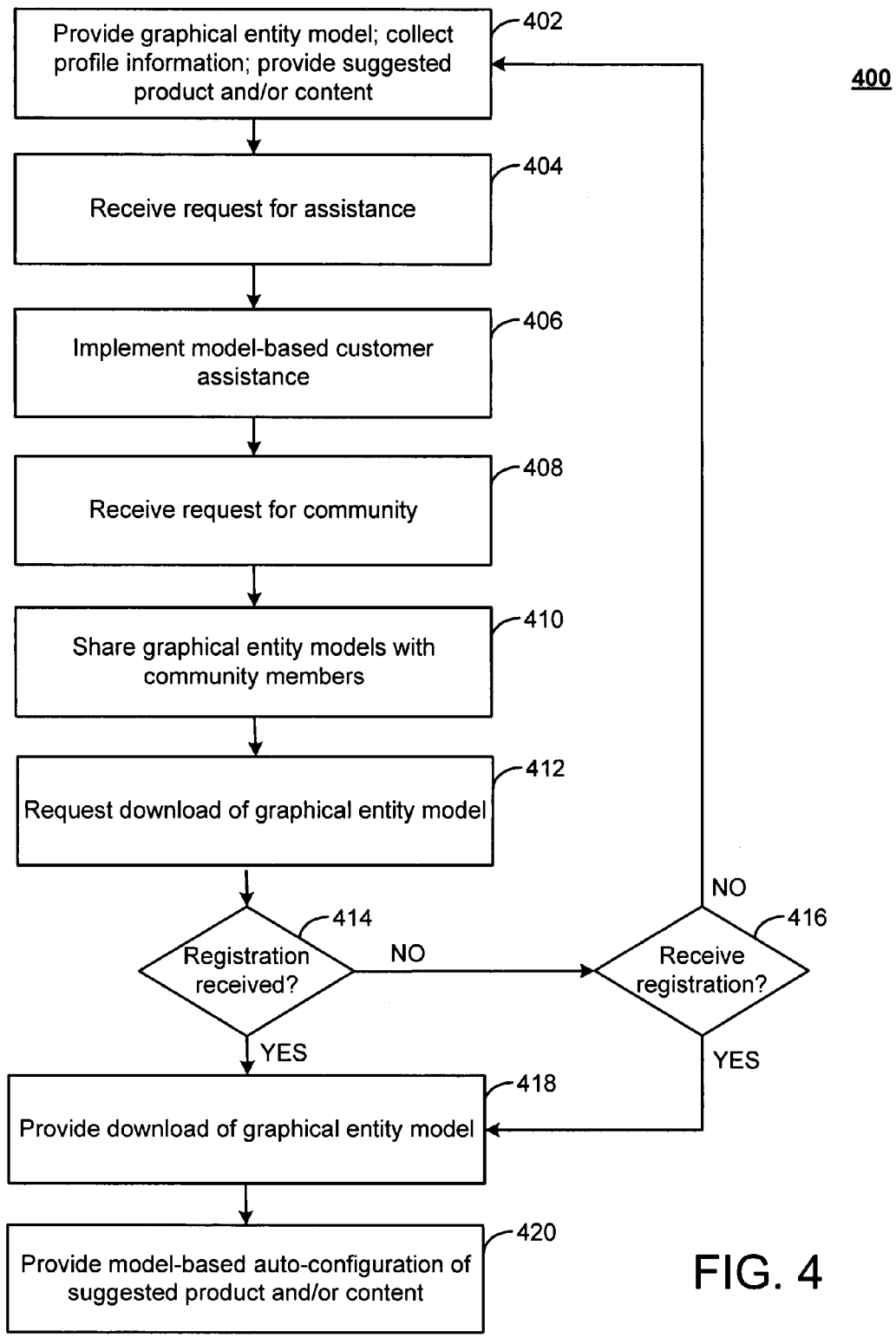
FIG. 4 is a flowchart illustrating example operations of the implementations of FIGS. 1 and 3.

FIG. 4 is a flowchart 400 illustrating example operations of the implementations of FIGS. 1 and 3. As in the example of FIG. 2, the order, sequence, and construction of FIG. 4 is intended merely for the sake of illustration and example, and is not intended to be limiting.

In FIG. 4, then, a graphical entity model may be provided while profile information is collected, so that suggested products and or content may be provided (402), for example, as described above. Of course, as described, these operations may be performed recursively or repetitively, as desired by the user(s).

A request for assistance may be received (404), such as when the customer representative 304 receives a request from the user 306b by way of the assistance selector 122. Accordingly, model-based customer assistance may be implemented (406), such as when the customer representative 304 uses a local model viewer 310c to view the graphical entity model 110b of the user 306b, perhaps in conjunction with a video conference or other communication technique for communicating with the user 306b.

Additionally, or alternatively, a request for joining a community may be received (408). As reference above, the community generator 312 may be used at this time either to create a new community or to discover an existing community which may be of interest to the user 306b. For example, the community generator 312 may identify the user 306a (and the graphical entity model 110) as being of interest to the user 306b, and the users 306a, 306b may thereafter be permitted to share one another's graphical entity models 110a, 110b, e.g., on their respective model viewers 310b, 310a (410). Of course, if additional users are included in the community, then all relevant graphical entity models may be viewable. Further, the customer representative 304 may, if requested, view some or all of the graphical entity models of the community.

At some point during the above operations, the user 306b may request a download of the graphical entity model 110b (412). For example, the rendering engine 128 may pro-actively offer this option to the user 306b, or the user 306b may attempt to save the graphical entity model 110b. At this point, a determination may be made (e.g., by the rendering engine 128, the report generator 136, and/or the registration system 316) as to whether a registration of the user 306b has been received (414). If not, then an attempt to obtain such registration information may be implemented (416), such as when the registration system 316 may request a name or email address of the user 306b, or other identifying information.

If registration was previously received (414) or is received at this point (416), then the download of the graphical entity model 110b may be provided (418). For example, the user 306b may actually download the graphical entity model 110b for local storage and maintenance thereof. In other examples, the user's identifying information may simply be associated with the graphical entity model 110b within the profile data 138 and/or the entity model database 134. In this latter case, then, the user 306b need not be responsible for storing the graphical entity model 110b, and may easily access and obtain the graphical entity model 110b at a later date for continued use or modification thereof.

Finally in the example of FIG. 4, a model-based auto-configuration of a suggested product or content may be provided (420). For example, the configuration logic 320 may detect that the graphical entity model 110b has been dragged-and-dropped over the first suggested product 118a, and may automatically fill-in or provide any information that is required by the first suggested product 118a and that is available or associated with the graphical entity model 110b. For example, the first suggested product may include business software, and the configuration logic 320 may fill-in information regarding the enterprise of the user 306b, as provided by the user 306b, the graphical entity model 110b, and/or the report generator 136.

FIG. 5 is a first screenshot 500 illustrating an example use of the systems of FIGS. 1 and 3. In FIG. 5, a plurality of entity characteristic icons 112a-112f are displayed as being arranged in a semi-circular manner around a first portion 502 of the screen, and thereby defining a second portion 504, which, as seen in FIG. 6, may be used to form the graphical entity model 110. In the example of FIG. 5, the entity characteristic icons 112a-112f include an employee icon 112a allowing for selection of a number of employees of the entity (here, an enterprise), a locations icon 112b allowing for selection of an existing or desired location of the entity, an industry icon 112c allowing for selection of an industry of the enterprise, a desired solutions icon 112d allowing for selection of a type of software solution, a top goals icon 112e allowing for selection of a type of goal of the enterprise, and a spending goals icon 112f allowing for selection of spending goals of the enterprise. Further in the screenshot 500, a third portion 506 of the screen includes suggested products 118a-118f, and the assistance selector 122 is illustrated as a "click to chat" icon 122 that allows the user to request a chat with a customer representative (such as the customer representative 304 of FIG. 3).

In the example of FIG. 5, each of the entity characteristic icons 112a-112f provides for selectable entity characteristics, such as selectable entity characteristics 508 of the employees icon 112a, which may be associated with different ranges of employees, such as 0-99, 100-499, 500-1000, 1000-2500, or greater than 2500. In example implementations, the user may select (e.g., click-on or hover over) the employee icon 112a to view the selectable entity characteristics 508, and then may select (e.g., click-on or hover over) any one or more of the selectable entity characteristics 508 as the first selected entity characteristic 114a (as seen in FIG. 1 as well as in FIG. 6, below). Selecting the employee icon 112a or any one of the selectable entity characteristic icons 508 may cause the selected icon to change color, grow in size, or otherwise indicate a status as being currently selected. The selectable entity characteristic icons 508 may disappear upon a re-selection of the employees icon 112a, or upon a subsequent selection of another entity characteristic icon, such as the entity characteristic icon 112b.

Each of the remaining entity characteristic icons 112b-112f may each have associated selectable entity characteristic icons, corresponding to the selectable entity characteristic icons 508 but suited to the entity characteristic in question. For example, the locations icon 112b may have locations such as North America, South America, Europe, Asia, Africa. Locations may be very broadly defined, in which case more specific locations may be provided as sub-selectable icons. Or, of course, locations may be narrowly defined with respect to a particular city or other local region. The industry icon 112c may be associated with selectable entity characteristics including industries such as automotive, chemical, consumer product, high-tech, industrial machinery and components, life sciences, professional services, or 'other.' The desired solutions icon 112d may be associated with selectable entity characteristics including supply chain management, product life cycle management, customer relationship management, or 'other.' The top goals icon 112e may be associated with selectable entity characteristics including compliance, innovation, growth, competitiveness, integration, customer service, data management, efficiency, or 'other.' The spending goals icon 112f may be associated with selectable entity characteristics including 'spend less on home-grown software,' 'invest in group-ware,' 'employee more than ten programmers,' 'internally build more enterprise-level software,' or 'other.'

FIG. 6 is a second screenshot 600 illustrating an example use of the systems of FIGS. 1 and 3. In the example of FIG. 6, selectable entity characteristics 602 associated with the locations icon 112b are illustrated as including an 'Asia' icon 604 and a plurality of sub-icons including a 'China' icon 606.

Meanwhile, the second portion 504 illustrates the graphical entity model 110, which reflects a number of selections from the entity characteristic icons 112a-112f. For example, selected entity characteristics from the selectable entity characteristics 508 may be dragged-and-dropped to the second portion 504, or a clicking or other selection of one of the selectable entity characteristic icons 504 may automatically cause an action or rendering within the second portion 504.

For example, the first selected entity characteristic 114a is illustrated as a selection of one of the selectable entity characteristics 508 of FIG. 5, specifically, a selection of a number of employees ranging from 500-999. As explained above, this selection is associated with a first graphical representation 116a, which in this case includes a campus of buildings that is sized by the rendering engine 128 according to the rendering rules 130 to illustrate the selected range of employees. Meanwhile, the locations icon 112b may be used to select locations including the United Kingdom and China, resulting in graphical representations 116ba (a United Kingdom flag) and 116bb (a Chinese flag). Additionally, a graphical representation 116c is illustrated as representing a particular industry (shown as 'industry 2' for the sake of example in FIG. 6), which may or may not be associated with a modification of the buildings 116a of the graphical entity model 110 (for example, if the industry relates to manufacturing, then the buildings may be changed to illustrate a manufacturing plant, with similar examples being apparent for other industries).

As described above, the user may select the click-to-chat selector 122 to conduct a chat or other communication with the customer representative 304. Also, although not shown in FIG. 6, the user also may request a community to be created or identified, based on the graphical entity model. In still other examples, the user may provide registration information in exchange for ownership or control of the graphical entity model 110. In this case, for example, the user may drag-and-drop the graphical entity model 110 onto one of the suggested products 118a-118f in the third portion 506 of the screenshot 500/600, so as to auto-fill the selected suggested product with information associated with the graphical entity model 110 (including, in some examples, the registration information).

Thus, the screenshots 500/600 provide a single screen where users can quickly and dynamically construct the graphical entity model, as described herein. Since the process is easy and stimulating, it is more likely that customers will be engaged and enticed to create their personal graphical entity models, more likely that the provider may obtain useful information about the users without offending or inconveniencing the users, and, ultimately, more likely that the provider will increase sales to a particular user or to a group of users.

It will be appreciated that many other examples and techniques may be used. For example, the graphical entity model 110 may include animation or video as the graphical representations. The graphical representations need not be combined in a one-to-one manner; rather, different combinations of graphical representations may result in different illustrations of any particular graphical representation. Other modifications and uses will be apparent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product for providing model-based customer engagement, the computer program product being tangibly embodied on a computer-readable storage medium and including executable code that, when executed, is configured to cause a data processing apparatus to provide a graphical user interface, the graphical user interface comprising: a first portion configured to display a plurality of selectable entity characteristic icons, to receive selections from a user of a first selected entity characteristic and of a second selected entity characteristic thereby, and to provide in response at least a first graphical representation and a second graphical representation thereof, respectively; a second portion configured to display a graphical entity model that includes a combination of the first graphical representation and the second graphical representation; and a third portion configured to display at least a first suggested product to the user, based on the graphical entity model.

2. The computer program product of claim 1 wherein the graphical user interface is configured to provide a drag-and-drop selection of the first selected entity characteristic from the first portion to the second portion, and configured to provide the first graphical representation in response thereto.

3. The computer program product of claim 1 wherein the first portion is configured to display the plurality of selectable entity characteristic icons as a plurality of entity characteristic icons arranged in a vicinity of the second portion.

4. The computer program product of claim 1 wherein the graphical user interface is configured to execute locally-executing instructions to detect the selection of the first selected entity characteristic and to transmit the selection of the first selected entity characteristic for determination therewith of a characteristic of the user.

5. The computer program product of claim 1 wherein the graphical user interface comprises a fourth portion configured to display at least one selector configured to provide the graphical entity model for viewing by a remote party.

6. The computer program product of claim 1 wherein the graphical user interface is configured to execute a registration of the user and to provide downloading and saving of the graphical entity model in response thereto.

7. A system embodied on a computer readable storage medium comprising: a request handler configured to receive a first selected entity characteristic of an entity and a second selected entity characteristic of the entity, based on a first entity characteristic icon and a second entity characteristic icon, respectively, that are displayed on a graphical user interface; a rendering engine configured to determine a first graphical representation of the first selected entity characteristic and a second graphical representation of the second selected entity characteristic, and further configured to combine the first graphical representation and the second graphical representation to obtain a graphical entity model and display the graphical entity model on the graphical user interface; and a report generator configured to determine profile information related to the user based on the graphical entity model, store the first entity characteristic, the second entity characteristic, and the graphical entity model in an entity model file, and store the entity model file in association with the profile information.

8. The system of claim 7 wherein the rendering engine is configured to display the first selected entity characteristic icon and the second selected entity characteristic icon based on rendering rules that define a placement, appearance, and operation thereof.

9. The system of claim 8 wherein the report generator is configured to determine the profile information based on report rules that define a nature, timing, and transmission of the report rules.

10. The system of claim 9 wherein the graphical user interface includes a browser, and wherein the request handler, rendering engine, and report generator are implemented locally to the browser and are configured to asynchronously load the rendering rules, report rules, and graphical representations.

11. The system of claim 10 comprising a recommendation system configured to provide a recommendation of a product to the user based on one or more of the entity model file or the profile information.

12. The system of claim 7 wherein the rendering engine is configured to provide an assistance selector within the graphical user interface that is associated with a provision of the graphical entity model for simultaneous viewing by a remote party.

13. The system of claim 7 comprising a community generator configured to determine at least one additional user associated with at least one additional graphical entity model, and configured to provide the user and the additional user with access to the additional graphical entity model and the graphical entity model, respectively.

14. The system of claim 7 comprising a registration system configured to determine a time to request registration of the user, and configured to provide increased access to the graphical entity model in response to the registration of the user.

15. The system of claim 7 comprising configuration logic configured to detect an association of the graphical entity model with one or more of a suggested product or provided content, and to configure the one or more of the suggested product or the provided content, based on the association and one or more of the entity model file or the profile information.

16. The system of claim 7 wherein the rendering engine is configured to render the graphical user interface having:
a first portion configured to display a plurality of selectable entity characteristic icons associated with each of the first entity characteristic icon and the second entity characteristic icon, to receive selections from the user of the first selected entity characteristic and of a second selected entity characteristic thereby, and to provide in response at least the first graphical representation and the second graphical representation thereof, respectively;
a second portion configured to display the graphical entity model; and
a third portion configured to display at least a first suggested product to the user, based on the graphical entity model.

17. A method comprising:
providing a plurality of entity characteristic icons to a user on a graphical user interface;
receiving a first selected entity characteristic of the entity by way of a first selected entity characteristic icon;
determining a first graphical representation of the first selected entity characteristic;

receiving a second selected entity characteristic of the entity by way of a second selected entity characteristic icon;

determining a second graphical representation of the second selected entity characteristic;

combining the first graphical representation and the second graphical representation to obtain a graphical entity model;

providing the graphical entity model on the graphical user interface;

determining profile information related to the user, based on the graphical entity model;

storing the first selected entity characteristic, the second selected entity characteristic, and the graphical entity model in an entity model file; and storing the entity model file in association with the profile information.

18. The method of claim 17 comprising:

providing a product recommendation based on the entity model file and the profile information.

19. The method of claim 17 comprising:

receiving a request for increased access to the entity model file;

requesting registration information from the user;

receiving the registration information; and providing the increase access in response to the receiving the registration information.

20. The method of claim 17 comprising:

providing remote viewing of the graphical entity model in response to a request from the user.

* * * * *